(12) United States Patent
Fabing et al.

(10) Patent No.: US 9,505,273 B2
(45) Date of Patent: Nov. 29, 2016

(54) STUDDED TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Daniel Fabing, Clermont-Ferrand (FR); Illyes Batnini, Clermont-Ferrand (FR); Pierre Lesage, Clermont-Ferrand (FR); Beatrice Lopez, Clermont-Ferrand (FR)

(73) Assignees: COMPAGNIE GENERALE DES ETABLISSEMENTS MICHELIN (FR); MICHELIN RECHERCHE ET TECHNIQUE S.A. (CH)

( * ) Notice: Subject to any disclaimer, the term of this patent is extended or adjusted under 35 U.S.C. 154(b) by 392 days.

(21) Appl. No.: 14/357,266

(22) PCT Filed: Nov. 13, 2012

(86) PCT No.: PCT/EP2012/072479
§ 371 (c)(1),
(2) Date: May 9, 2014

(87) PCT Pub. No.: WO2013/072303
PCT Pub. Date: May 23, 2013

(65) Prior Publication Data
US 2014/0338806 A1    Nov. 20, 2014

(30) Foreign Application Priority Data

Nov. 15, 2011  (FR) ...................................... 11 60364

(51) Int. Cl.
*B60C 11/00* (2006.01)
*B60C 11/16* (2006.01)
*B60C 1/00* (2006.01)

(52) U.S. Cl.
CPC ......... *B60C 11/1693* (2013.04); *B60C 1/0016* (2013.04); *B60C 11/1637* (2013.04); *B60C 11/1656* (2013.04); *B60C 11/0041* (2013.04)

(58) Field of Classification Search
CPC ........... B60C 11/1637; B60C 11/1656; B60C 11/0041; B60C 11/1606
See application file for complete search history.

(56) References Cited

U.S. PATENT DOCUMENTS

2004/0079471 A1    4/2004  Brivio et al.

FOREIGN PATENT DOCUMENTS

DE    102010015939    11/2011
EP    1055509    11/2000
(Continued)

OTHER PUBLICATIONS

Partial machine translation for Japan 61-145007 U (no date).*

(Continued)

*Primary Examiner* — Steven D Maki
(74) *Attorney, Agent, or Firm* — Dickinson Wright PLLC (57) ABSTRACT

The invention relates to a studded tire the tread of which comprises a first part in contact with the ground and a second part placed radially to the inside of the first part, and at least one stud protruding from the tread, and the head of the stud being entirely anchored in the second part of the tread, in which the complex modulus G*(0° C.) of the rubber composition forming the first part of the tread is less than 1.5 MPa and in which the complex modulus G* of the rubber composition forming the second part of the tread varies with temperature such that G*(5° C.) is equal to or greater than 5 MPa and G*(20° C.) is less than or equal to 0.5 G*(5° C.).

10 Claims, 3 Drawing Sheets

(56) References Cited

FOREIGN PATENT DOCUMENTS

| | | | |
|---|---|---|---|
| JP | 58051134 | | 3/1983 |
| JP | 59-199307 A | * | 11/1984 |
| JP | 61-145007 U | * | 9/1986 |
| JP | 2009-023602 A | * | 2/2009 |

OTHER PUBLICATIONS

Machine translation for Japan 2009-023602 (no date).*
Machine translation for Japan 59-199307 (no date).*
International Search Report for PCT/EP2012/072479 dated Jan. 17, 2013.

* cited by examiner

STUDDED TIRE

FIELD OF THE INVENTION

This application is a 371 of PCT/EP2012/072479, filed Nov. 13, 2012, which claims the benefit of FR1160364, filed Nov. 15, 2011, the entire contents of each of which are incorporated herein by reference for all purposes.

BACKGROUND

1. Field

The present disclosure relates to tires for running on ice that include studs (i.e. "studded tires").

2. Description of Related Art

Studded tires have undeniable advantages in terms of behavior in winter driving conditions, such as for example driving on an icy surface. Contact with the ice, and more particularly penetration of the studs into the ice, compensates for observed reduction in grip of the tread pattern elements of the tire. The studs scratch the ice and generate additional forces on the ice.

One of the difficulties in using studded tires consists of the fact that these tires, when used on a non-icy road, degrade the surface condition of the road and lead to premature wear of the roadway. It is for this reason that a number of countries have prohibited studded tires or have limited their use to certain types of vehicle and/or to limited periods.

It has been proposed (see Japanese patent JP 63-297109) to reduce this problem by combining the studs with bearing elements made of a rubber composition that are deformed when a radial force is exerted on the studs. The rubber composition of which these bearing elements are made is chosen so that their resistance to deformation increases when their temperature drops. If the tire is running on ice, the temperature of the bearing element is low and its resistance to deformation is high. Consequently, the bearing element withstands the force transmitted by the stud and protrudes from the tread, so as to scratch the ice. In contrast, when the tire is running on a non-icy roadway, the temperature of the bearing element is higher and it has a lower resistance to deformation. Consequently, the studs may disappear into the tread each time that they come into contact with the roadway.

Although this approach has enabled the negative effect of studded tires on roadways to be reduced, the Applicant has found that the proposed solution is still insufficient as the point of operation of the studded tire is not optimized.

It has also been proposed (document JP 58 051134) to vulcanize the studs in a cube of rubber composition in a first stage and to stick or vulcanize this composite in the tread. The reader who wants to know other documents defining the technological background of the invention, will consult with profit documents EP 1 055 509 and DE 10 2010 015939.

SUMMARY

One of the objectives of embodiments of the invention is to provide a studded tire possessing excellent grip on ice while still having a lesser impact on asphalt.

This objective is achieved by a tire intended to run along ground that may be covered with ice, comprising:

a tread comprising a first part in contact with the ground and at least one second part placed radially to the inside of the first part, the first part of the tread being formed from a first rubber composition and the second part of the tread being formed from a second rubber composition different from the first rubber composition; and at least one stud comprising:
    a head intended to anchor the stud in the tread, the head having a maximum dimension DT;
    a protuberance intended to come into contact with the ice;
    a body joining the head and the protuberance, the body having an axis of symmetry, the assembly formed by the head and the body of the stud having a radial height HA; and
    a longitudinal axis passing through the axis of symmetry of the body, in which said at least one stud is placed in the tread so that:
    its longitudinal axis is approximately parallel to a radial direction;
    the protuberance of the stud protrudes from the tread when the stud is not in contact with the ground;
    the body of the stud is at least partially in contact with the first part of the tread; and
    the head of the stud is entirely anchored in the second part of the tread, in which said at least one second part of the tread surrounds the head of said at least one stud and extends:
    radially to the inside of the head of the stud over a distance DI from the radially innermost point of the stud, the distance DI being equal to or greater than 40% of the maximum dimension DT of the head of the stud (DI≥0.4DT/2);
    radially to the outside of the head of the stud over a distance DE from the radially innermost point of the stud, the distance DE being equal to or greater than 40% (and, preferably equal to or greater than 60%) of said radial height HA; and
    in all directions perpendicular to the longitudinal axis of the stud over a distance DP from the longitudinal axis of the stud, the distance DP being equal to or greater than the maximum dimension DT of the head of the stud, in which the complex modulus G*(0° C.) of the first rubber composition is less than 1.5 MPa; and in which the complex modulus G* of the second rubber composition varies with temperature such that G*(5° C.) is equal to or greater than 5 MPa and G*(20° C.) is less than or equal to 0.5 G*(5° C.).

Tests carried out by the Applicant have demonstrated that this configuration very substantially improves the compromise between grip on ice and deleterious effects of the stud (in terms of road wear and noise inside the vehicle).

A skin formed from the first rubber composition may be placed between said at least one stud and said at least one second part of the tread, the thickness of the skin, measured perpendicularly to the surface of the stud, being less than or equal to 1 mm.

According to one particular embodiment, the tire comprises a plurality of studs, in which tire the tread comprises a plurality of second parts formed from the second rubber composition and in which the head of each stud is entirely anchored in a second, separate part of the tread. This embodiment makes it possible to reduce the amount of second rubber composition, which may be advantageous if this rubber composition is expensive or if other considerations make it desirable to provide other rubber compositions in the depth of the tread. It also makes it possible for the tire to maintain a good grip when tread wear is advanced.

According to an alternative embodiment, the tire comprises a plurality of studs, in which tire the tread comprises a single second part formed from the second rubber composition, and in which the heads of all the studs are anchored in this second part. This embodiment is advantageous as it reduces the complexity of the manufacturing process.

According to a first preferable option, the radial height HA is equal to or greater than 9 mm but less than or equal to 10 mm. Thus, the studs are well anchored in the tread and suitable longevity in terms of wear is obtained.

According to a second preferable option, the maximum dimension DT of the head of the stud is equal to or greater than 8 mm but less than or equal to 10 mm. These dimensions make it possible to achieve a good compromise between facility of stud incorporation and stud retention in the tread.

According to a third preferable option, the distance DI is equal to or greater than 4 mm but less than or equal to 4.5 mm. Such a distance makes it possible to reduce the risk of the crown reinforcement oxidizing, while still maintaining a reasonable tread thickness.

According to a fourth preferable option, the distance DP is equal to or greater than 1.5DT but less than or equal to 2.5DT (1.5DT≤DP≤2.5DT). More particularly preferably, DP=2DT. Thus, the effect of the second rubber composition is optimized.

According to a fifth preferable option, said at least one stud is made of a material having a thermal conductivity equal to or greater than 150 W/(m·K). Aluminium, gold, copper, silver or even diamond are all such materials.

Preferably, the second rubber composition comprises a first SBR (styrene-butadiene rubber) elastomer having a glass transition temperature ($T_g$) of −25° C. or higher but not exceeding +20° C. ("very high $T_g$"), having a content of 30 phr or higher but not exceeding 60 phr, and also at least one other diene elastomer having a content of 40 phr or higher but not exceeding 70 phr.

More preferably, said first SBR elastomer has a glass transition temperature ($T_g$) of −20° C. or higher but not exceeding +10° C. and more preferably still has a glass transition temperature ($T_g$) of −15° C. or higher but not exceeding 0° C.

Preferably, said other diene elastomer is chosen from the group formed by polybutadienes, natural rubber, synthetic polyisoprenes and blends of these elastomers.

According to a preferred embodiment, the second rubber composition comprises a blend of elastomers comprising said SBR elastomer having a very high $T_g$, having a content of 30 phr or higher but not exceeding 60 phr, a BR (polybutadiene), having a content of 5 phr or higher but not exceeding 50 phr, and natural rubber, having a content of 10 phr or higher but not exceeding 60 phr, the total content being equal to 100 phr.

According to a preferred embodiment, the second rubber composition comprises at least one silica filler and at least one carbon black, the content of said at least one silica filler being 70 phr or higher but not exceeding 100 phr and the content of said at least one carbon black being 1 phr or higher but not exceeding 10 phr.

According to another preferred embodiment, the second rubber composition comprises at least one silica filler and at least one carbon black, the content of said at least one silica filler being 10 phr or higher but not exceeding 30 phr and the content of said at least one carbon black being 60 phr or higher but not exceeding 80 phr.

DETAILED DESCRIPTION OF SPECIFIC EMBODIMENTS

When using the term "radial", a distinction should be made between a number of different uses of the word by a person skilled in the art. Firstly, the expression refers to a radius of the tire. It is in this sense that a point P1 is said to be "radially inner to" a point P2 (or "radially to the inside of" the point P2) if it is closer to the rotation axis of the tire than the point P2. Conversely, a point P3 is said to be "radially outer to" a point P4 (or "radially to the outside of" the point P4) if it is further from the rotation axis of the tire than the point P4. A direction is said to be "radially towards the inside (or the outside)" when the direction is towards smaller (or larger) radii. When it is a question of radial distances, this sense of the term also applies.

Secondly, a thread or reinforcement is said to be "radial" when the thread or reinforcing elements of the reinforcement make an angle equal to or greater than 80° but less than or equal to 90° with the circumferential direction. It will be noted that in the present document, the term "thread" is to be understood in an entirely general sense and comprises threads in the form of monofilaments, multifilaments, cords, twisted yarns or equivalent assemblies, irrespective of the constituent material of the thread or the surface treatment applied to promote the bonding thereof to the rubber.

Finally, the term "radial section" or "radial cross section" is understood here to mean a section or cross section in a plane that contains the rotation axis of the tire.

An "axial" direction is a direction parallel to the rotation axis of the tire. A point P5 is said to be "axially inner to" a point P6 (or "axially to the inside of" the point P6) if it is closer to the mid-plane of the tire than the point P6. Conversely, a point P7 is said to be "axially outer to" a point P8 (or "axially to the outside of" the point P8) if it is further from the mid-plane of the tire than the point P8. The "mid-plane" of the tire is the plane which is perpendicular to the rotation axis of the tire and equidistant from the annular reinforcing structures of each bead. When it is stated that the mid-plane separates, in any radial section, the tire into two "tire halves", this does not mean that the mid-plane necessarily constitutes a plane of symmetry of the tire. The expression "tire half" in this case has a broader meaning and denotes a portion of the tire having an axial width close to half the axial width of the tire.

A "circumferential" direction is a direction which is perpendicular both to a radius of the tire and to the axial direction.

The "rolling surface" of a tread denotes here all the points on the tread that come into contact with ground when the tire, inflated to its service pressure and with no studs, runs along ground.

In the context of the present document, the expression "rubber composition" denotes a rubber composition comprising at least one elastomer and at least one filler.

In the present document, the terms "elastic modulus G'" and "viscous modulus G''" denote dynamic properties well known to those skilled in the art. These properties are measured using a viscoanalyser of the Metravib VA4000 type on test pieces moulded from uncured compositions. Test pieces such as those described in the ASTM D 5992 (1996) standard (the version published in September 2006 but initially approved in 1996) in figure X2.1 (circular embodiment) are used. The diameter "d" of the test piece is 10 mm (it therefore has a circular cross section of 78.5 mm²) and the thickness "L" of each of the portions of rubber composition is 2 mm, giving a "d/L" ratio of 5 (unlike the ISO 2856 standard, mentioned in the ASTM standard, paragraph X2.4, which recommends a d/L value of 2).

The response of a specimen of a vulcanized rubber composition, subjected to sinusoidal stress in alternating simple shear, at a frequency of 10 Hz, is recorded. The test piece is stressed in sinusoidal shear at 10 Hz with an imposed stress (0.7 MPa), symmetrically about its equilibrium position.

An accommodation of the test piece is carried out prior to the measurement. The test piece is then stressed in sinusoidal shear at 10 Hz, at 100% peak-to-peak deformation, at room temperature.

The measurement is carried out with the temperature increasing at 1.5° C. per minute, from a temperature $T_{min}$ below the glass transition temperature ($T_g$) of the material up to a temperature $T_{max}$, which may correspond to the rubbery plateau of the material. Before starting the scan, the specimen is stabilized at the temperature $T_{min}$ for 20 minutes so as to have a uniform temperature within the specimen. The results employed are the dynamic elastic shear modulus (G') and the viscous shear modulus (G") at the chosen temperatures (in this case, at 0°, 5° and 20° C.)

The complex modulus G* is defined as the absolute value of the complex sum of the elastic modulus G' and viscous modulus G":

$$G^* = \sqrt{G'^2 + G''^2}.$$

Figure 1:
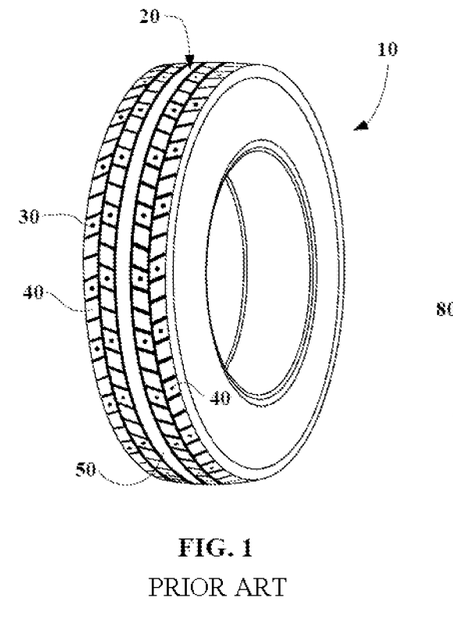
FIG. 1 shows a studded tire according to the prior art.

FIG. 1 schematically shows a tire 10 according to the prior art, the tread 20 of which comprises a plurality of studs 30. The studs 30 are placed over the entire width of the rolling surface in rubber blocks 40 of the tread 20. Of course, the central rib 50 of the tread may also be provided with studs 30. The studs 30 are placed in a number of positions around the periphery of the tire so that at any instant studs are in contact with the ground over which the tire is running.

Figure 2:
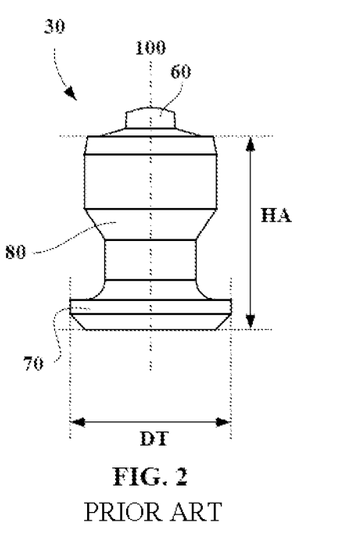
FIG. 2 shows a stud according to the prior art.

FIG. 2 shows schematically a stud 30 according to the prior art. The stud 30 has a head 70 intended to anchor the stud 30 in a tread, the head 70 having a maximum dimension DT. It further includes a protuberance 60 intended to come into contact with the ice when the stud 30 is mounted in a tire running on ground covered with ice. Very often, the protuberance 60 is made with the help of a material different from that of the rest of the stud 30 thereby enabling a harder material to be used for this part, which is subject to very high mechanical stresses. A body 80 joins the head to the protuberance. The body has an axis of symmetry 100 that also defines the "longitudinal axis" of the stud 30. The assembly formed by the head 70 and the body 80 of the stud has a radial height HA which here is 9.5 mm.

Figure 3:
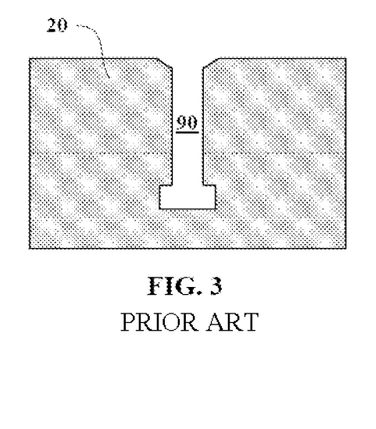
FIG. 3 shows a cavity according to the prior art.

FIG. 3 shows schematically a part of the tread 20 of the tire 10. This tread 20 is provided with a cavity 90, each cavity having a cylindrical portion open to the outside of the tread 20 of the tire 10 and designed to cooperate with a stud 30.

Figure 4:
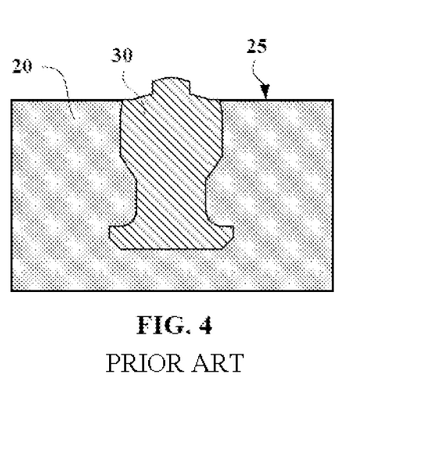
FIG. 4 shows a stud inserted into a cavity according to the prior art.

FIG. 4 shows schematically the same part of the tread 20 (with its rolling surface 25) after insertion of the stud 30. Because of the elasticity of the rubber composition forming the tread 20, the tread 20 perfectly surrounds the stud 30 and anchors it firmly in the tire.

Figure 5:
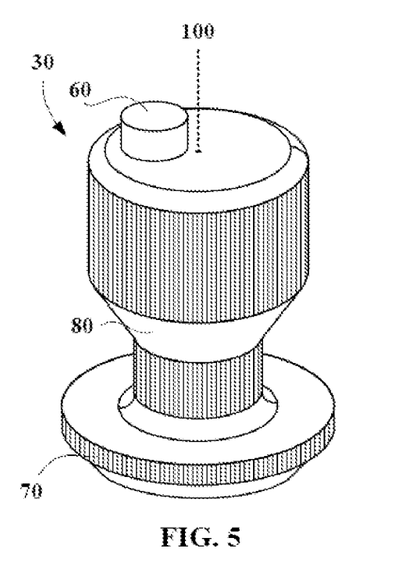
FIG. 5 shows schematically a stud having an off-centre protuberance.

The stud used is not necessarily a stud having an axis of symmetry, such as the stud 30 shown in FIG. 2. It is perfectly possible to use a stud 30 having an off-centre protuberance 60, such as the stud shown in FIG. 5.

Figure 6:
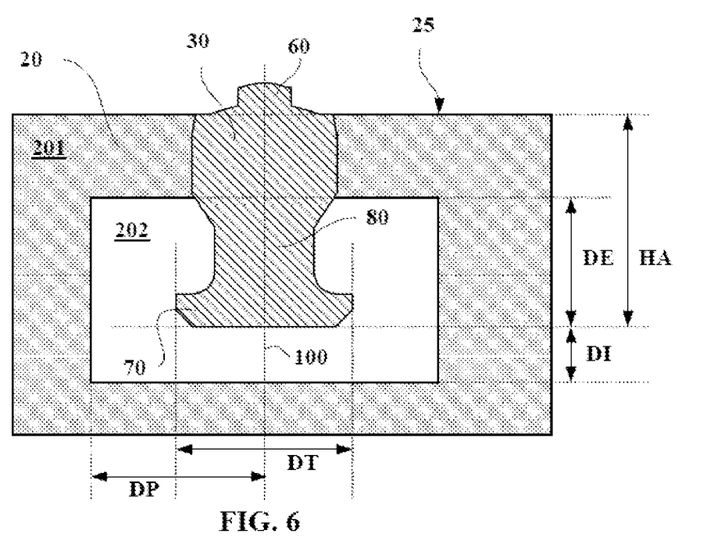
FIGS. 6 to 8 each show a portion of a tire according to embodiments of the invention.

FIG. 6 shows a portion of a tire according to the invention. Shown here is a portion of the tread 20 that includes a first part 201 which is in contact with the ground (by the rolling surface, indicated by the reference 25) and a second part 202, placed radially to the inside of the first part 201. The first part 201 of the tread 20 is formed from a first rubber composition and the second part of the tread is formed from a second rubber composition, different from the first rubber composition. The characteristics of these rubber compositions will be explained afterwards.

The tire includes a stud, which has a head 70 intended to anchor the stud 30 in the tread, the head 70 having a maximum dimension DT, and a protuberance 60, intended to come into contact with the ice. A body 80 joins the head 70 to the protuberance 60. The body 80 has an axis of rotational symmetry. The "longitudinal axis" 100 of the stud 30 coincides with this axis of symmetry. The assembly formed by the head 70 and the body 80 of the stud has a radial height HA (here, 9.5 mm).

The stud 30 is placed in the tread 20 so that its longitudinal axis 100 is approximately parallel to a radial direction and the protuberance 60 of the stud 30 protrudes from the tread 20 when the stud is not in contact with the ground (as is the case in FIG. 6). The body 80 of the stud is at least partially in contact with the first part 201 of the tread 20. However, the head 70 of the stud 30 is entirely anchored in the second part 202 of the tread 20. The second part 202 of the tread 20 therefore surrounds the head 70 of the stud and extends radially to the inside of the head of the stud over a distance DI from the radially innermost point of the stud, the distance DI being equal to or greater than 40% of the maximum dimension DT of the head of the stud (DI≥0.4DT/2). In this case, DI=4.2 mm and DT=9 mm. Therefore DI is equal to 47% of the maximum dimension DT. The second part 202 of the tread 20 extends radially to the outside of the head 70 of the stud 30 over a distance DE from the radially innermost point of the stud 30, the distance DE being equal to or greater than 40% of said radial height HA. In this case, DE=6.5 mm and DE/HA=68%. Finally, the second part 202 of the tread 20 extends in all directions perpendicular to the longitudinal axis 100 of the stud over a distance DP from the longitudinal axis of the stud, the distance DP being equal to or greater than the maximum dimension DT of the head of the stud. In the case shown in FIG. 6, DT=9 mm and DP=9 mm. Ideally, DP is larger and corresponds to twice DT.

Returning to the first rubber composition (forming the first part 201 of the tread 20) and to the second rubber composition (forming the second part 202 of the tread 20).

Without being bound by theory, embodiments are believed to benefit from the non-uniform temperature distribution within the tread of a studded tire running on ice. The rubber compositions used in the tires are distinguished by their low thermal conductivity (typically around 0.3 W/(m·K)). This is much lower than that of the materials with which the studs are made, such as for example mild steel (46 W/(m·K)), Al—SiC (175 W/(m·K)) or aluminium (237 W/(m·K)). When a stud is in contact with ice, it rapidly takes on the temperature of the ice and heat is transferred between the rubber composition surrounding the stud (and in particular its head, where the surface area for heat exchange is large). The rubber composition surrounding the head of the stud, i.e. the second part 202 of the tread 20, is therefore at a temperature below that of most of the tread (and especially the first part 201 of the tread 20). However, the grip on ice is entirely determined by the first part 201 of the tread 20 which is in direct contact with the ice. By carefully choosing the rubber compositions forming the first part 201 and the second part 202 of the tread 20, it is possible to obtain a tire having excellent grip on ice, whereby the mechanical behaviour changes according to the temperature of the ground over which it is running. If a second rubber composition (that forming the second part 202 of the tread 20) which is rigid at low temperature but softer at high temperature is chosen, the stud will have a tendency to remain protruding from the tread when the ground is cold (tire running on ice) and to be inclined, by deforming the rubber composition that surrounds it, when the ground is warmer (tire running on asphalt not covered with ice). The Applicant has discovered that this effect is optimized when the complex modulus G*(0° C.) of the first rubber composition is less than 1.5 MPa and the complex modulus G* of the second rubber composition varies with temperature such that G*(5° C.) is equal to or greater than 5 MPa and G*(20° C.) is less than or equal to 0.5 G*(5° C.).

Table I gives, as an example, the recipe for a first and second rubber composition for obtaining such a performance. The recipe is given in phr ("per hundred parts of rubber"), that is to say in parts by weight per 100 parts by weight of rubber. The corresponding complex moduli are also indicated.

TABLE I

| Parts in phr | First rubber composition | Second rubber composition |
|---|---|---|
| SBR (1) | 30 | — |
| BR (2) | 17 | 52 |
| NR (3) | 53 | 10 |
| SBR (4) | — | 38 |
| Silica (5) | 60 | 90 |
| Silane (6) | 4.6 | 7.1 |
| Carbon black (7) | 4 | 4 |
| Liquid plasticizer (8) | 40 | 13 |
| Solid plasticizer (9) | — | 20 |
| Stearic acid | 1.7 | 1.85 |
| Anti-ozone wax | 1.3 | 1.5 |
| Antioxidant (10) | 2.2 | 2 |
| DPG (11) | 1.8 | 2.1 |
| ZnO | 1.3 | 0.7 |
| Soluble sulphur | 1.9 | 1.6 |
| CBS (12) | 2 | 1.45 |
| G*(0° C.) | 0.9 | 9 |
| G*(5° C.) | 0.87 | 5.2 |
| G*(20° C.) | 0.82 | 2.23 |

The annotations in Table I are as follows:
(1) SBR solution, with 16% of styrene units and 24% of 1,2-units of the butadiene part ($T_g$ = −65° C.);
(2) Polybutadiene with 4% of 1,2-units and 93% of cis-1,4-units ($T_g$ = −160° C.);
(3) Natural rubber;
(4) SBR solution, with 44% of styrene units and 41% of 1,2-units of the butadiene part ($T_g$ = −12° C.) carrying a silanol functional group on the end of the elastomer chain ($T_g$ = −12° C.);
(5) "Zeosil 1165 MP" silica from Rhodia (the "HDS" (highly dispersible silica) type);
(6) TESPT silane coupling agent ("S169" from Evonik);
(7) ASTM N234 grade carbon black (from Cabot);
(8) MES oil ("Catenex SNR" from Shell);
(9) C5/C9 resin ("Escorez ECR-373" from Exxon Mobil);
(10) N-(1,3-dimethylbutyl)-N'-phenyl-p-phenylenediamine from Flexsys;
(11) Diphenylguanidine ("Perkacit DPG" from Flexsys); and
(12) N-dicyclohexyl-2-benzothiazole sulphenamide ("Santocure CBS" from Flexsys).

The rubber compound is preferably based on at least one diene elastomer, at least one reinforcing filler and at least one crosslinking system.

The term "diene" elastomer (or rubber) is understood, as is known, to mean an elastomer (i.e. a homopolymer or a copolymer) at least partly obtained from diene monomers, i.e. monomers carrying two carbon-carbon double bonds, whether or not conjugated. The diene elastomer used is preferably chosen from the group formed by: polybutadienes (BR); natural rubber (NR); synthetic polyisoprenes (IR); styrene-butadiene copolymers (SBR); butadiene-isoprene copolymers (BIR); styrene-isoprene copolymers (SIR); styrene-butadiene-isoprene copolymers (SBIR) and blends of these elastomers.

A preferred embodiment consists in using an "isoprene" elastomer, i.e. an isoprene homopolymer or copolymer, in other words a diene elastomer chosen from the group formed by natural rubber (NR), synthetic polyisoprenes (IR), the various isoprene copolymers and blends of these elastomers.

The isoprene elastomer is preferably natural rubber or a synthetic polyisoprene of the cis-1,4 type. Among these synthetic polyisoprenes, it is preferred to use polyisoprenes having an amount (in mol %) of cis-1,4 bonds greater than 90%, more preferably still greater than 98%. According to other preferred embodiments, the diene elastomer may consist, entirely or partly, of another diene elastomer such as, for example, an SBR elastomer (E-SBR or S-SBR) possibly blended with another elastomer, for example of the BR type.

The rubber composition may also include all or some of the additives conventionally used in rubber matrices intended for the manufacture of tires, such as, for example, reinforcing fillers, such as carbon black or inorganic fillers such as silica, coupling agents for coupling inorganic filler, anti-ageing agents, antioxidants, plasticizers or extender oils, whether the latter are of aromatic or non-aromatic nature (especially non-aromatic or very slightly aromatic oils, for example of the naphthenic or paraffinic type, having a high, or preferably a low, viscosity, MES or TDAE oils, plasticizing resins having a high $T_g$, above 30° C.), processing aids making it easier to process the compositions in the green state, tackifying resins, a crosslinking system based either on sulphur or on sulphur donors and/or a peroxide-based crosslinking system, accelerators, vulcanization activators or retarders, anti-reversion agents, methylene acceptors and donors such as, for example, HMT (hexamethylenetetramine) or H3M (hexamethoxymethyl-melamine), reinforcing resins (such as resorcinol or bismaleimide), and known adhesion promoter systems, for example of the metal salt, especially cobalt or nickel salt, type.

The compositions are manufactured in suitable mixers, using two successive preparation phases well known to those skilled in the art, namely a first, thermomechanical working or kneading phase (called the "non-productive" phase) at high temperature, up to a maximum temperature of between 110° C. and 190° C., preferably between 130° C. and 180° C., followed by a second, mechanical working phase (called the "productive" phase) up to a lower temperature, typically below 110° C., during which finishing phase the crosslinking system is incorporated.

To give an example, the non-productive phase is carried out in a single thermomechanical step lasting a few minutes (for example between 2 and 10 minutes) during which all the necessary basic constituents and other additives, with the exception of the crosslinking or vulcanization system, are introduced into a suitable mixer, such as a standard internal mixer. After the mixture thus obtained has cooled down, the vulcanization system is then incorporated in an external mixer, such as a two-roll open mill, maintained at low temperature (for example between 30° C. and 100° C.) All the ingredients are then mixed (during the productive phase) for a few minutes (for example between 5 and 15 minutes).

The final composition thus obtained is then calendered, for example in the form of a sheet or plaque for characterization, or else extruded so as to form the external tread used in a tire according to the embodiment of the invention.

The vulcanization (or curing) may then be carried out in a known manner, generally at a temperature between 130° C. and 200° C., preferably under pressure, for a sufficient time, which may for example vary between 5 and 90 minutes depending in particular on the curing temperature, on the vulcanization system adopted and on the rate of vulcanization of the composition in question.

The embodiment shown in FIG. 6 corresponds to the case in which the head of each stud is entirely anchored in a second, separate part of the tread. This embodiment makes it possible to reduce the amount of the second rubber composition, which may be advantageous if this rubber composition is expensive or if other considerations make it desirable to provide other rubber compositions within the depth of the tread.

Figure 7:
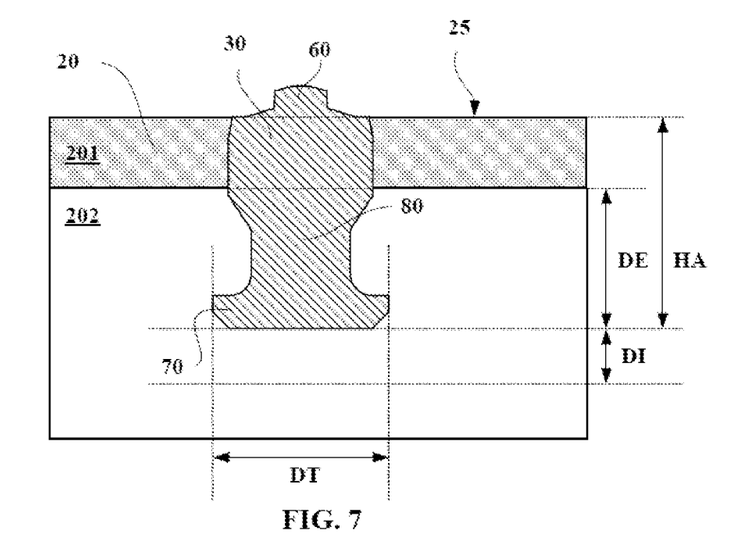

However, there are other advantageous embodiments. In particular, it is possible for the tread 20 to comprise a single second part 202 formed from the second rubber composition, the heads 70 of all the studs 30 being anchored in this second part 202. This embodiment, shown schematically in FIG. 7, is advantageous insofar as it reduces the complexity of the manufacturing process. This is because it is possible to apply the second part 202 by simply placing it on the crown reinforcement of the tire.

Figure 8:
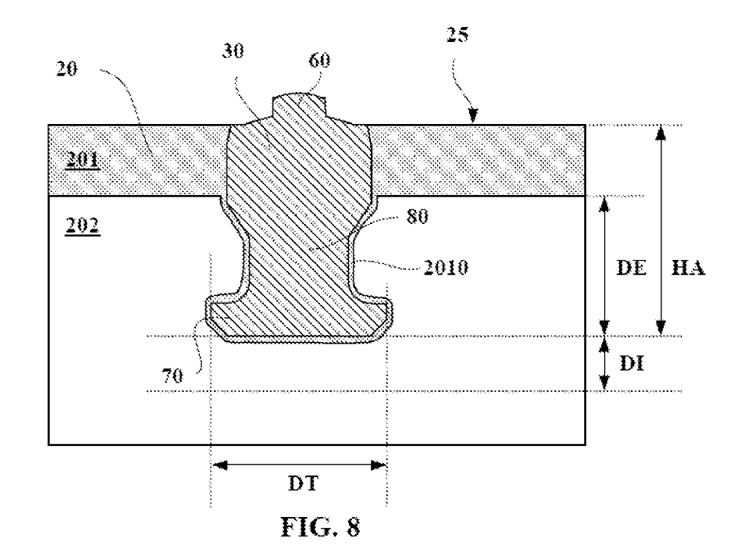

It should be pointed out that a skin 2010 formed from the first rubber composition may be placed between the stud 30 and the second part 202 of the tread, as shown schematically in FIG. 8. This is not necessarily a desired configuration but one which may be caused by moulding the cavities in the tread, when the elements provided for moulding the cavity penetrate the uncured tread and cause a small portion of the first rubber composition to creep towards the lower part of the cavity. This creep, which may therefore result in the formation of a thin skin formed from the first rubber composition between the stud and the second part of the tread, have no significant effect on the performance of a tire according to the invention provided that the thickness of the skin, measured perpendicularly to the surface of the stud, is less than or equal to 1 mm.

The Applicant has carried out comparative trials on ice and on asphalt with tires of 205/55 R16 size fitted onto an Audi A4 vehicle. A tire of the type shown in FIG. 7 (with the rubber compositions of Table I) was compared with an equivalent tire, the sole difference of which was that the second part 202 of the tread 20 was made from the same composition as the first part 201 of the tread, that is to say the first rubber composition of Table I.

TABLE II

|  | Ice grip | Road wear |
| --- | --- | --- |
| Control tire | 100 | 100 |
| Tire according to the invention | 115 | 100 |

This shows that the tire according to the invention has a better grip on ice without at all affecting the road wear.

The invention claimed is:

1. A tire adapted to run along ground which may be covered with ice, comprising:
   a tread comprising a first part in contact with the ground and at least one second part placed radially to the inside of the first part, the first part of the tread being formed from a first rubber composition and the second part of the tread being formed from a second rubber composition different from the first rubber composition; and
   at least one stud comprising:
      a head intended to anchor the stud in the tread, the head having a maximum dimension DT;
      a protuberance intended to come into contact with the ground, or ice or both;
      a body joining the head and the protuberance, the body having an axis of symmetry, an assembly formed by the head and the body of the stud having a radial height HA; and
      a longitudinal axis passing through the axis of symmetry of the body,
   wherein at least one stud is placed in the tread so that:
      its longitudinal axis is approximately parallel to a radial direction;
      the protuberance of the stud protrudes from the tread when the stud is not in contact with the ground;
      the body of the stud is at least partially in contact with the first part of the tread; and
      the head of the stud is entirely anchored in the second part of the tread,
   wherein at least one second part of the tread surrounds the head of said at least one stud and extends:
      radially to the inside of the head of the stud over a distance DI from the radially innermost point of the stud, the distance DI being equal to or greater than 40% of the maximum dimension DT of the head of the stud (DI≥0.4DT/2);
      radially to the outside of the head of the stud over a distance DE from the radially innermost point of the stud, the distance DE being equal to or greater than 40% of said radial height HA; and
      in all directions perpendicular to the longitudinal axis of the stud over a distance DP from the longitudinal axis of the stud, the distance DP being equal to or greater than the maximum dimension DT of the head of the stud,
   wherein a skin may optionally be formed from the first rubber composition and placed between said at least one stud and said at least one second part of the tread, wherein the thickness of any skin (2010), measured perpendicularly to the surface of the stud, is less than or equal to 1 mm;
   wherein the complex modulus G*(0° C.) of the first rubber composition is less than 1.5 MPa; and
   wherein the complex modulus G* of the second rubber composition varies with temperature such that G*(5° C.) is equal to or greater than 5 MPa and G*(20° C.) is less than or equal to 0.5 G*(5° C.).

2. The tire according to claim 1, wherein the tire comprises a plurality of studs, wherein the tread comprises a plurality of second parts formed from the second rubber composition and wherein the head of each stud is entirely anchored in a second, separate part of the tread.

3. The tire according to claim 1, wherein the tire comprises a plurality of studs, in which tire the tread comprises a single second part formed from the second rubber composition, and wherein the heads of all the studs are anchored in this second part.

4. The tire according to claim 1, wherein the radial height HA is equal to or greater than 9 mm but less than or equal to 10 mm.

5. The tire according to claim 1, wherein the distance DE is equal to or greater than 60% of said radial height HA.

6. The tire according to claim 1, wherein the maximum dimension DT of the head of the stud is equal to or greater than 8 mm but less than or equal to 10 mm.

7. The tire according to claim 1, wherein the distance DI is equal to or greater than 4 mm but less than or equal to 4.5 mm.

8. The tire according to claim 1, wherein the distance DP is equal to or greater than 1.5DT but less than or equal to 2.5DT (1.5DT≤DP≤2.5DT).

9. The tire according to claim 8, wherein the distance DP is equal to twice the maximum distance DT of the head of the stud (DP=2DT).

10. The tire according to claim 1, wherein at least one stud is made of aluminium or copper.

* * * * *